(12) United States Patent
Kuroumaru et al.

(10) Patent No.: US 8,216,104 B2
(45) Date of Patent: Jul. 10, 2012

(54) GEAR SET AND NUTATION GEAR SET

(75) Inventors: Yoshikazu Kuroumaru, Kashihara (JP);
Masahide Nitano, Toyota (JP); Satoshi Motoyama, Okazaki (JP); Makoto Yamasawa, Higashihiroshima (JP)

(73) Assignees: JTEKT Corporation, Osaka-Shi (JP); Ogino Kogyo Co., Ltd., Hiroshima (JP)

( * ) Notice: Subject to any disclaimer, the term of this patent is extended or adjusted under 35 U.S.C. 154(b) by 331 days.

(21) Appl. No.: 12/652,880

(22) Filed: Jan. 6, 2010

(65) Prior Publication Data
US 2010/0179012 A1   Jul. 15, 2010

(30) Foreign Application Priority Data
Jan. 13, 2009   (JP) ................................ 2009-004859

(51) Int. Cl.
*F16H 23/00* (2006.01)
*F16H 1/32* (2006.01)
(52) U.S. Cl. ........................................ 475/164; 475/180
(58) Field of Classification Search .................. 475/163, 475/164, 180
See application file for complete search history.

(56) References Cited

U.S. PATENT DOCUMENTS

| | | | |
|---|---|---|---|
| 4,041,808 A | * | 8/1977 | Fickelscher .................. 475/164 |
| 5,562,560 A | * | 10/1996 | Kanamaru et al. ............ 475/163 |
| 5,954,610 A | | 9/1999 | Kamimura |
| 5,967,883 A | | 10/1999 | Kamimura |
| 6,348,021 B1 | * | 2/2002 | Lemanski ..................... 475/164 |

FOREIGN PATENT DOCUMENTS

| | | |
|---|---|---|
| DE | 197 57 671 A1 | 10/1998 |
| JP | A-11-315908 | 11/1999 |
| JP | A-2008-138765 | 6/2008 |

OTHER PUBLICATIONS

Mar. 17, 2010 Search Report issued in European Patent Application No. 10150538.6.

* cited by examiner

*Primary Examiner* — Edwin A Young
(74) *Attorney, Agent, or Firm* — Oliff & Berridge, PLC (57) ABSTRACT

A first gear set includes an input member that serves as a first gear and an inner ring that serves as a second gear. A first end of the inner ring is inclined with respect to the input member and is in mesh with the input member. The input member has a plurality of retention grooves that are formed in an input member body and a plurality of pins that are retained in the respective retention grooves and that respectively constitute teeth of the input member. The first end has a plurality of tooth grooves that are engageable with the pins. A resultant force of forces applied to each pin from the retention groove and the tooth groove urges the pin toward the retention groove.

9 Claims, 10 Drawing Sheets

GEAR SET AND NUTATION GEAR SET

INCORPORATION BY REFERENCE

The disclosures of Japanese Patent Application No. 2009-004859 filed on Jan. 13, 2009 including the specification, drawings and abstract, is incorporated herein by reference in its entirety.

BACKGROUND OF THE INVENTION

1. Field of the Invention

The invention relates to a gear set and a nutation gear set.

2. Description of the Related Art

Some of gear sets include two bevel gears in mesh with each other (for example, see Japanese Patent Application Publication No. 11-315908 (JP-A-11-315908)). In JP-A-11-315908, the first and second gears are in mesh with each other, and the second gear is inclined with respect to the first gear. The first gear has a plurality of grooves, and rollers are arranged in the grooves so as to protrude from the grooves. The rollers form semi-cylindrical convex teeth. On the other hand, the second gear has a plurality of grooves, and has semi-cylindrical concave teeth. Then, as the first gear rotates, part of the convex teeth of the first gear are in mesh with part of the concave teeth of the second gear. Thus, the first gear rotates the second gear.

A situation that the rollers that constitute the convex teeth lift from the grooves of the first gear or slip off from the grooves (tooth jumping) leads to a torque loss or occurrence of noise, so it is undesirable. JP-A-11-315908 is not intended to actively press the rollers against the grooves of the first gear, so it is insufficient to prevent the rollers from lifting from the grooves of the first gear or slipping off from the grooves.

SUMMARY OF THE INVENTION

The invention provides a gear set and nutation gear set that are able to prevent lifting or slipping of members that constitute teeth.

An aspect of the invention provides a gear set that includes: a first gear that is rotatable around a first axis; and a second gear that is rotatable around a second axis inclined with respect to the first axis, and that is in mesh with the first gear so that torque is transmittable. One of the first and second gears includes a plurality of retention grooves that are arranged so as to radiate around an axis of the one of the first and second gears and a plurality of pins that are retained in the respective retention grooves and that respectively constitute teeth of the one of the first and second gears. The other one of the first and second gears includes a plurality of tooth grooves that are arranged so as to radiate around an axis of the other one of the first and second gears and that are engageable with the pins. A resultant force of forces applied to each pin from the retention groove and the tooth groove urges the pin toward the retention groove.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described with reference to the accompanying drawings.

Figure 1:
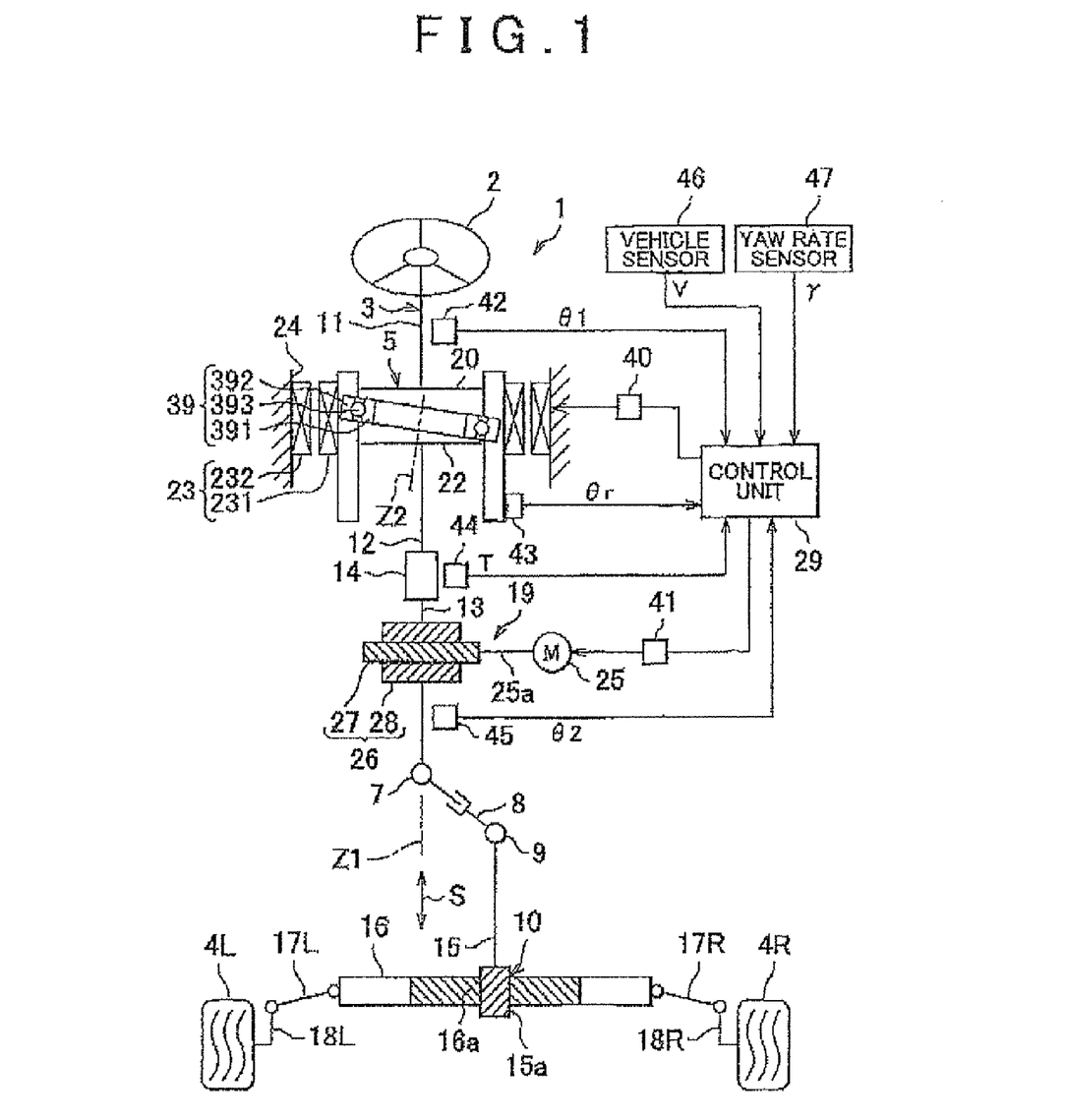
FIG. 1 is a view that shows the schematic configuration of a vehicle steering system equipped with a transmission ratio variable mechanism according to a first embodiment of the invention.

FIG. 1 is a view that shows the schematic configuration of a vehicle steering system 1 equipped with a transmission ratio variable mechanism according to a first embodiment of the invention. Referring to FIG. 1, the vehicle steering system 1 applies steering torque, given to a steering member 2 such as a steering wheel, to respective right and left steered wheels 4R and 4L via a steering shaft 3, or the like. The vehicle steering system 1 has a variable gear ratio (VGR) function. The VGR function is able to change a transmission ratio $\theta 2/\theta 1$ that is the ratio of a steered angle $\theta 2$ of each steered wheel to a steering angle $\theta 1$ of the steering member 2.

The vehicle steering system 1 includes the steering member 2 and the steering shaft 3 coupled to the steering member 2. The steering shaft 3 includes first to third shafts 11 to 13 that are arranged along the same axis. The respective central axes of the first to third shafts 11 to 13 are also the rotation axes of the first to third shafts 11 to 13.

The steering member 2 is coupled to one end of the first shaft 11 so as to be integrally rotatable. The other end of the first shaft 11 is coupled to one end of the second shaft 12 via the transmission ratio variable mechanism 5 so as to be differentially rotatable. The second shaft 12 and the third shaft 13 are coupled with each other via a torsion bar 14 so that the second shaft 12 and the third shaft 13 are elastically rotatable relative to each other within a predetermined range and torque transmission is allowed therebetween.

The third shaft 13 is coupled to the steered wheels 4R and 4L via a universal joint 7, an intermediate shaft 8, a universal joint 9, a steered mechanism 10, and the like.

The steered mechanism 10 includes a pinion shaft 15 and a rack shaft 16. The pinion shaft 15 is coupled to the universal joint 9. The rack shaft 16 has a rack 16a that is in mesh with a pinion 15a formed at the distal end of the pinion shaft 15. The rack shaft 16 serves as a steered shaft extending in a transverse direction of a vehicle. Knuckle arms 18R and 18L are coupled to a pair of respective ends of the rack shaft 16 via tie rods 17R and 17L.

With the above configuration, rotation of the steering member 2 is transmitted to the steered mechanism 10 via the steering shaft 3, and the like. In the steered mechanism 10, rotation of the pinion 15a is converted into axial movement of the rack shaft 16. The axial movement of the rack shaft 16 is transmitted via the tie rods 17R and 17L to the corresponding knuckle arms 18R and 18L, thus causing the knuckle arms 18R and 18L to pivot. By so doing, the steered wheels 4R and 4L coupled to the respective knuckle arms 18R and 18L are steered, respectively.

The transmission ratio variable mechanism 5 is used to change the rotational transmission. ratio (transmission ratio $\theta 2/\theta 1$) between the first and second shafts 11 and 12 of the steering shaft 3, and is formed as a nutation gear mechanism. The transmission ratio variable mechanism 5 includes an input member 20, an output member 22 and a raceway ring unit 39. The input member 20 is provided at the other end of the first shaft 11. The output member 22 is provided at one end of the second shaft 12. The raceway ring unit 39 serves as an intermediate member interposed between the input member 20 and the output member 22.

The input member 20 is coupled to the steering member 2 and the first shaft 11 so that torque is transmittable. The output member 22 is coupled to the second shaft 12 so that torque is transmittable. A first axis Z1 is the central axis and rotation axis of each of the input member 20 and the output member 22.

The output member 22 is coupled to the steered wheels 4R and 4L via the second shaft 12, the steered mechanism 10, and the like.

The raceway ring unit 39 includes an inner ring 391, an outer ring 392 and rolling elements 393. The inner ring 391 serves as a first raceway ring. The outer ring 392 serves as a second raceway ring. The rolling elements 393 are balls, or the like, interposed between the inner ring 391 and the outer ring 392, and constitute ball bearings.

The rolling elements 393 may be cylindrical rollers, needle rollers and tapered rollers, other than balls. In addition, the rolling elements 393 may be arranged in a single row or in a double row. When the rolling elements 393 are arranged in a double row, it is desirable to prevent inclination of the inner ring 391 with respect to the outer ring 392. A double row angular bearing may be exemplified as a double row bearing.

The inner ring 391 couples the input member 20 to the output member 22 so as to be differentially rotatable. The inner ring 391 and the outer ring 392 each have a second axis Z2 as a central axis that is inclined with respect to the first axis Z1. The second axis Z2 is inclined at a predetermined inclination angle with respect to the first axis Z1. The inner ring 391 is rotatably supported by the outer ring 392 via the rolling elements 393, so the inner ring 391 is rotatable around the second axis Z2. The inner ring 391 is also rotatable around the first axis Z1 as a transmission ratio variable mechanism motor 23 is driven. The transmission ratio variable mechanism motor 23 is an electric motor that serves as an actuator for driving the outer ring 392. The inner ring 391 and the outer ring 392 are able to perform Coriolis motion (oscillating motion) around the first axis Z1.

The transmission ratio variable mechanism motor 23 is arranged radially outward of the raceway ring unit 39, and has the first axis Z1 as a central axis. The transmission ratio variable mechanism motor 23 changes the transmission ratio $\theta 2/\theta 1$ by varying the rotational speed of the outer ring 392 around the first axis Z1.

The transmission ratio variable mechanism motor 23 is, for example, formed of a brushless motor. The transmission ratio variable mechanism motor 23 includes a rotor 231 and a stator 232. The rotor 231 retains the outer ring 392 of the raceway ring unit 39. The stator 232 surrounds the rotor 231 and is fixed to a housing 24 that serves as a steering column. The rotor 231 rotates around the first axis Z1.

The vehicle steering system 1 includes a steering assist force application mechanism 19 for applying steering assist force to the steering shaft 3. The steering assist force application mechanism 19 includes the second shaft 12, the third shaft 13, a torque sensor 44, a steering assist motor 25 and a decelerating mechanism 26. The second shaft 12 serves as an input shaft coupled to the output member 22 of the transmission ratio variable mechanism 5. The third shaft 13 serves as an output shaft coupled to the steered mechanism 10. The torque sensor 44 detects torque transmitted between the second shaft 12 and the third shaft 13 and will be described later. The steering assist motor 25 serves as a steering assist actuator. The decelerating mechanism 26 is interposed between the steering assist motor 25 and the third shaft 13.

The steering assist motor 25 is formed of an electric motor, such as a brushless motor. The output of the steering assist motor 25 is transmitted to the third shaft 13 via the decelerating mechanism 26.

The decelerating mechanism 26 is for example, formed of a worm mechanism. The decelerating mechanism 26 includes a worm shaft 27 and a worm gear 28. The worm shaft 27 serves as a drive gear that is coupled to the output shaft 25a of the steering assist motor 25. The worm gear 28 serves as a driven gear that is in mesh with the worm shaft 27 and that is integrally rotatably coupled to the third shaft 13. Note that the decelerating mechanism 26 is not limited to the worth gear mechanism; the decelerating mechanism 26 may be another gear mechanism, such as a parallel shaft gear mechanism using a spar gear or a helical gear.

The transmission ratio variable mechanism 5 and the steering assist force application mechanism 19 are provided for the housing 24. The housing 24 is arranged inside a cabin of the vehicle. Note that the housing 24 may be arranged so as to surround the intermediate shaft 8 or may be arranged inside an engine room of the vehicle.

The transmission ratio variable mechanism motor 23 and the steering assist motor 25 each are controlled to be driven by a control unit 29 that includes a CPU, a RAM and a ROM. The control unit 29 is connected to the transmission ratio variable mechanism motor 23 via a drive circuit 40, and is connected to the steering assist motor 25 via a drive circuit 41.

A steering angle sensor 42, a motor resolver 43, the torque sensor 44, a steered angle sensor 45, a vehicle speed sensor 46 and a yaw rate sensor 47 are connected to the control unit 29. The motor resolver 43 serves as a rotation angle detector means for detecting the rotation angle of the transmission ratio variable mechanism motor 23. The torque sensor 44 serves as a torque detector.

A signal indicating the rotation angle of the first shaft 11 is input from the steering angle sensor 42 to the control unit 29 as a value corresponding to a steering angle $\theta 1$ that is an operation amount from the straight-ahead position of the steering member 2. A signal indicating the rotation angle $\theta r$ of the rotor 231 of the transmission ratio variable mechanism motor 23 is input from the motor resolver 43 to the control unit 29. A signal indicating torque applied between the second shaft 12 and the third shaft 13 is input from the torque sensor 44 to the control unit 29 as a value corresponding to a steering torque T applied to the steering member 2. A signal indicating the rotation angle of the third shaft 13 is input from the steered angle sensor 45 to the control unit 29 as a value corresponding to a steered angle $\theta 2$. A signal indicating the vehicle speed V is input from the vehicle speed sensor 46 to the control unit 29. A signal indicating the yaw rate $\gamma$ of the vehicle is input from the yaw rate sensor 47 to the control unit 29.

The control unit 29 controls the transmission ratio variable mechanism motor 23 and the steering assist motor 25 for driving on the basis of signals from the sensors 42 to 47, or the like.

With the above configuration, the output of the transmission ratio variable mechanism 5 is transmitted to the steered mechanism 10 via the steeling assist force application mechanism 19. More specifically, the steering torque input to the steering member 2 is input to the input member 20 of the transmission ratio variable mechanism S via the first shaft 11, and is transmitted from the output member 22 to the second shaft 12 of the steering assist force application mechanism 19. The steering torque transmitted to the second shaft 12 is transmitted to the torsion bar 14 and the third shaft 13, and is transmitted to the steered mechanism 10 together with the output from the steering assist motor 25 via the intermediate shaft 8, or the like.

Figure 2:
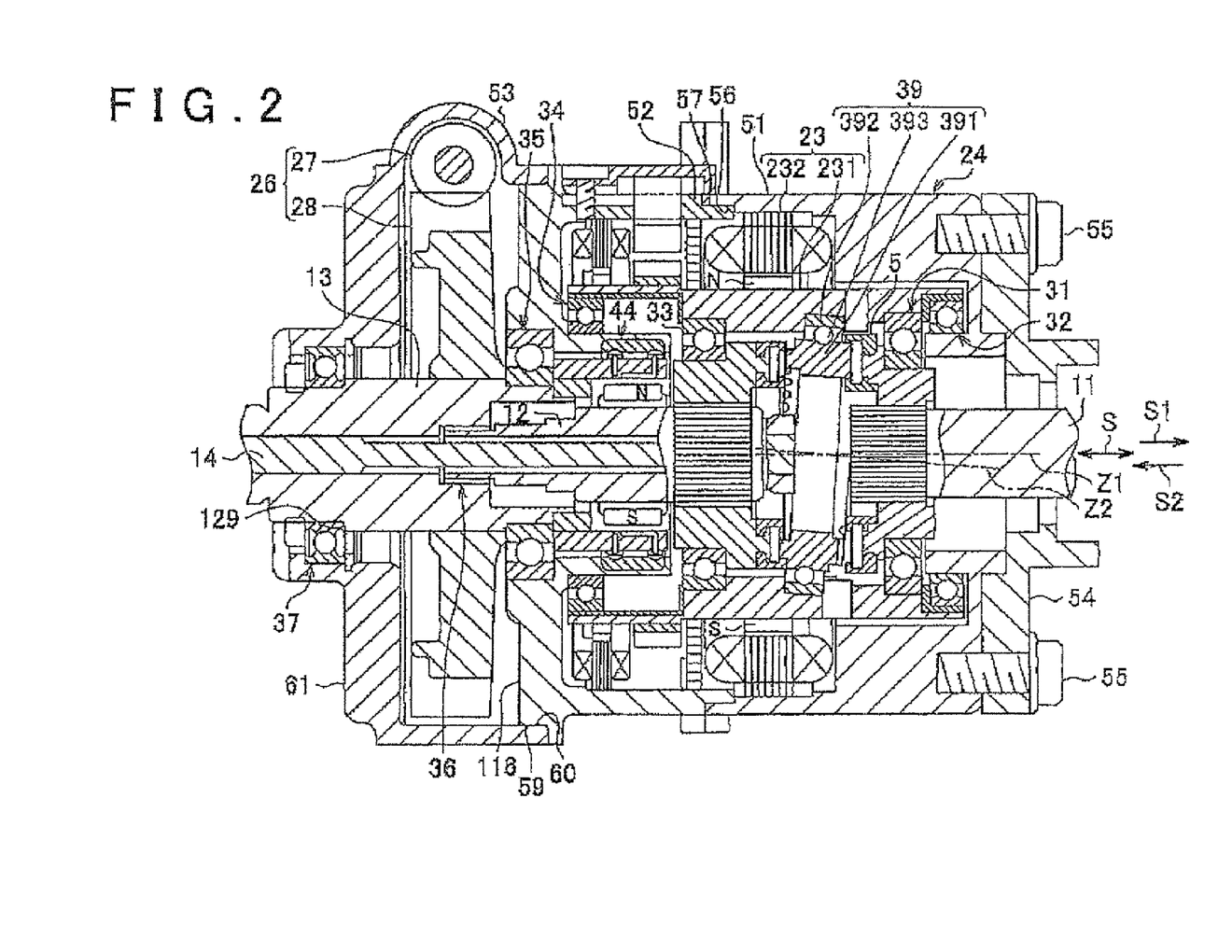
FIG. 2 is a cross-sectional view that shows the further specific configuration of a relevant portion of FIG. 1.

FIG. 2 is a cross-sectional view that shows the specific configuration of a relevant portion of FIG. 1. Referring to FIG. 2, the housing 24 is, for example, made by forming metal, such as aluminum alloy, into a cylindrical shape. The housing 24 includes first to third housings 51 to 53. First to seventh bearings 31 to 37 are accommodated in the housing 24. The fast to fifth bearings 31 to 35 and the seventh bearing 37 each are a rolling bearing, such as an angular ball bearing. The sixth bearing 36 is a rolling bearing, such as a needle roller bearing.

The first housing 51 has a cylindrical shape. The first housing 51 constitutes a differential mechanism housing that accommodates the transmission ratio variable mechanism 5 serving as a differential mechanism. The first housing 51 also constitutes a motor housing that accommodates the transmission ratio variable mechanism motor 23. One end of the first housing 51 is covered with, an end wall member 54. One end of the first housing 51 and the end wall member 54 are fixed to each other using a fastening member 55, such as a bolt. An annular protrusion 57 of one end of the second housing 52 is fitted to an inner peripheral surface 56 of the other end of the first housing 51. These first and second housings 51 and 52 are fixed to each other using a fastening member (not shown), such as a bolt.

The second housing 52 has a cylindrical shape. The second housing 52 constitutes a sensor housing and a resolver housing. The sensor housing accommodates the torque sensor 44. The resolver housing accommodates the motor resolver 43. An inner peripheral surface 60 of one end of the third housing 53 is fitted to an outer peripheral surface 59 of the other end of the second housing 52.

The third housing 53 has a cylindrical shape. The third housing 53 constitutes a decelerating mechanism housing that accommodates the decelerating mechanism 26. An end wall portion 61 is provided at the other end of the third housing 53. The end wall portion 61 has an annular shape, and covers the other end of the third housing 53.

Figure 3:
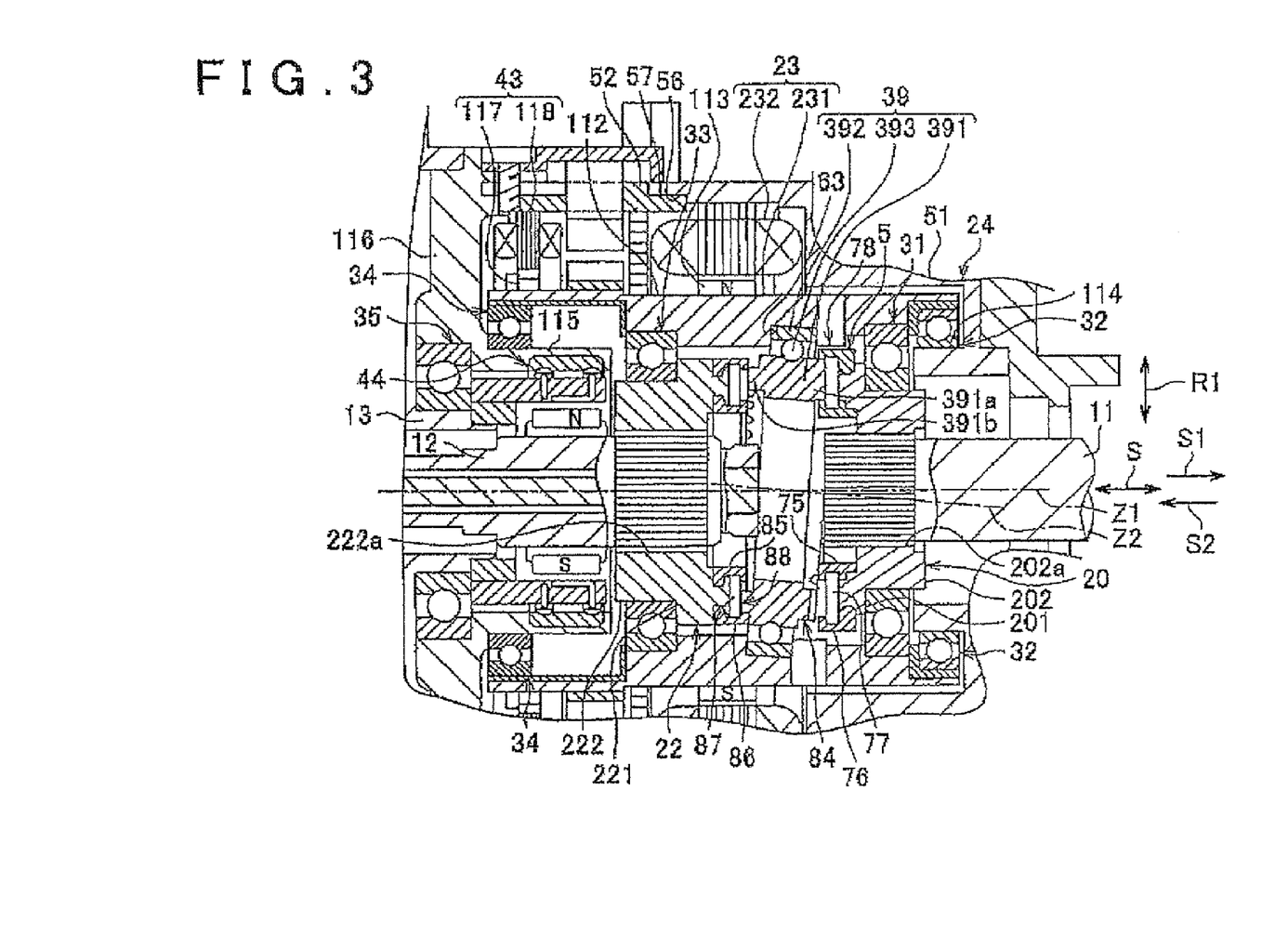
FIG. 3 is an enlarged view of the transmission ratio variable mechanism of FIG. 2 and its surroundings.

FIG. 3 is an enlarged view of the transmission ratio variable mechanism 5 of FIG. 2 and its surroundings. Referring to FIG. 3, the input member 20 and output member 22 of the transmission ratio variable mechanism 5 and the inner ring 391 of the raceway ring unit 39 each have an annular shape.

The input member 20 is formed as a first gear. The input member 20 includes an input member body 201, a cylindrical body 202, a plurality of pins 77, an inner retainer 75 and an outer retainer 76. The cylindrical member 202 is arranged radially inward of the input member body 201 and is integrally rotatable with the input member body 201. The plurality of pins 77 are retained by the input member body 201. The inner retainer 75 and the outer retainer 76 retain the plurality of pins 77 by the input member body 201. The input member body 201 and the cylindrical member 202 are integrally formed using a single material.

The other end of the first shaft 11 is inserted through an insertion hole 202a of the cylindrical member 202. The other end of the first shaft 11 that serves as the input shaft of the transmission ratio variable mechanism 5 is coupled to the cylindrical member 202 by, for example, serration engagement so that torque is transmittable.

The output member 22 is formed as a first gear. The output member 22 includes an output member body 221, a cylindrical member 222, a plurality of pins 87, an inner retainer 85 and an outer retainer 86. The cylindrical member 222 is arranged radially inward of the output member body 221 and is integrally rotatable with the output member body 221. The plurality of pins 87 are retained by the output member body 221. The inner retainer 85 and the outer retainer 86 retain the plurality of pins 87 by the output member body 221. The output member body 221 and the cylindrical member 222 are integrally formed using a single material.

One end of the second shaft 12 is inserted through an insertion hole 222a of the cylindrical member 222 of the output member 22. An intermediate portion of the second shaft 12 that serves as the output shaft of the transmission ratio variable mechanism 5 is coupled to the output member 22 by, for example, serration engagement so that torque is transmittable.

The inner ring 391 of the raceway ring unit 39 is all integrally formed using a single member, and is arranged between the input member 20 and the output member 22. The inner ring 391 is formed as a second gear that is paired with the input member 20 serving as the first gear, and is formed as a second gear that is paired with the output member 22 serving as the first gear. With respect to the axial direction of the inner ring 391, a first end 391a of the inner ring 391 is formed as a gear element of the second gear, and a second end 391b of the inner ring 391 is formed as a gear element of the second gear. The first and second ends 391a and 391b have the common axis, and are integrally rotatable around the second axis Z2 serving as the common axis.

The input member 20 and the inner ring 391 that is in mesh with the input member 20 so that torque is transmittable form a first gear set 78. The first gear set 78 is a bevel gear set. In addition, the output member 22 and the inner ring 391 that is in mesh with the output member 22 so that torque is transmittable form a second gear set 88. The second gear set 88 is a bevel gear set. In addition, the first gear set 78 and the second gear set 88 form a nutation gear set 84. The input member 20 and output member 22 of the nutation gear set have the common first axis Z1, and are arranged on opposite sides of the first end 391a and second end 391b of the inner ring 391. The outer ring 392 is fixedly press-fitted into an inclined hole 63 that is formed on the inner periphery of the rotor 23 of the transmission ratio variable mechanism motor 23. The outer ring 392 integrally rotates with the rotor 231 around the first axis Z1. As the rotor 231 rotates around the first axis Z1, the raceway ring unit 39 performs Coriolis motion. Note that the outer ring 392 may couple the input member 20 to the output member 22 so as to be differentially rotatable, and the inner ring 391 may be integrally rotatably coupled to the rotor 231 of the transmission ratio variable mechanism motor 23. In this case, the raceway ring unit 39 is of an inner ring support type.

Figure 4:
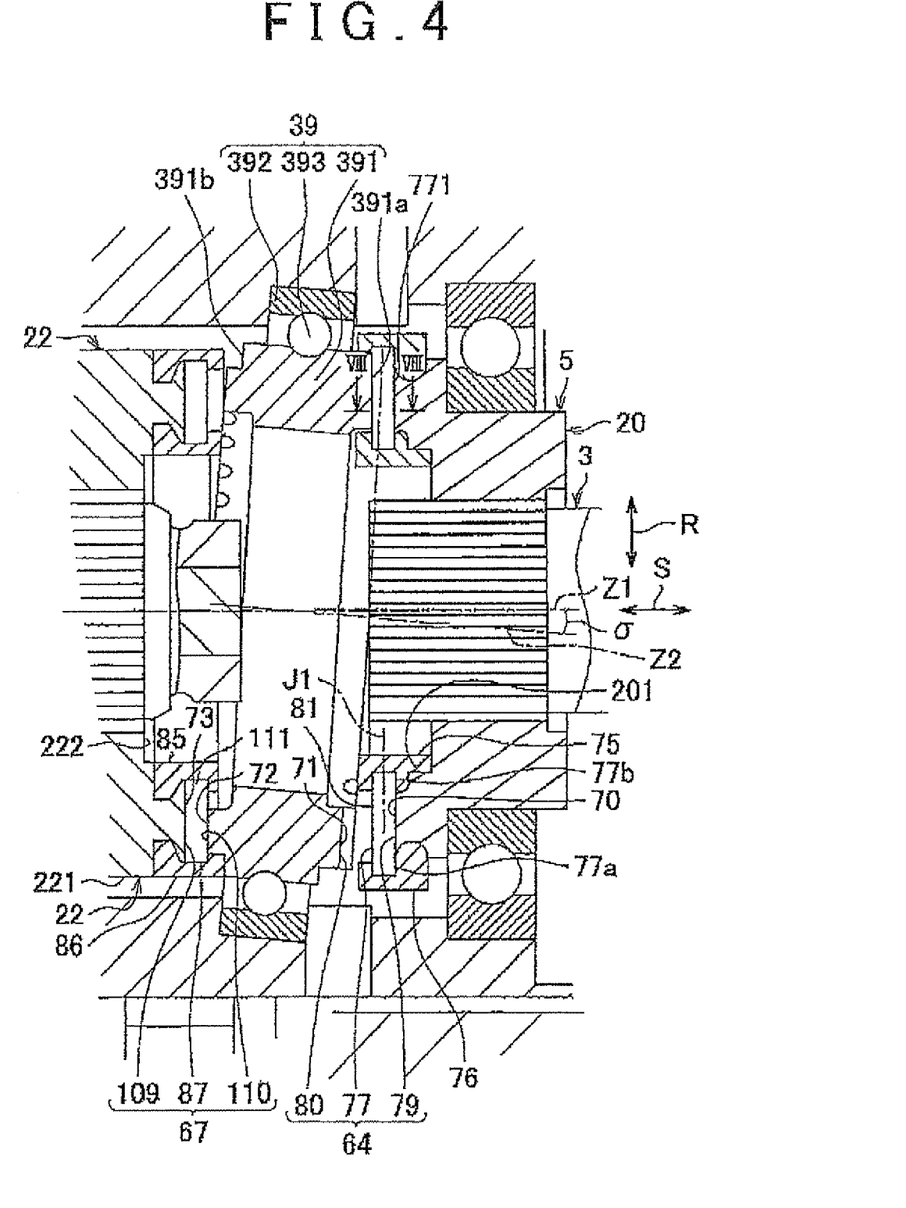
FIG. 4 is an enlarged view of a relevant portion of the transmission ratio variable mechanism of FIG. 3.

FIG. 4 is an enlarged view of a relevant portion of the transmission ratio variable mechanism 5 of FIG. 3. Referring to FIG. 4, within the first end 391a of the inner ring 391, an end surface facing the input member 20 is defined as a first end surface 71. Within the second end 391b of the inner ring 391, an end surface facing the output member 22 is defined as a second end surface 72. The input member 20 and the first end 391a of the inner ring 391 have first concave convex engaging portions 64. This allows torque transmission between the input member 20 and the first end 391a. In addition, the second end 391b of the inner ring 391 and the output member 22 have second concave convex engaging portions 67. This allows torque transmission between the second end 391b and the output member 22.

Figure 5:
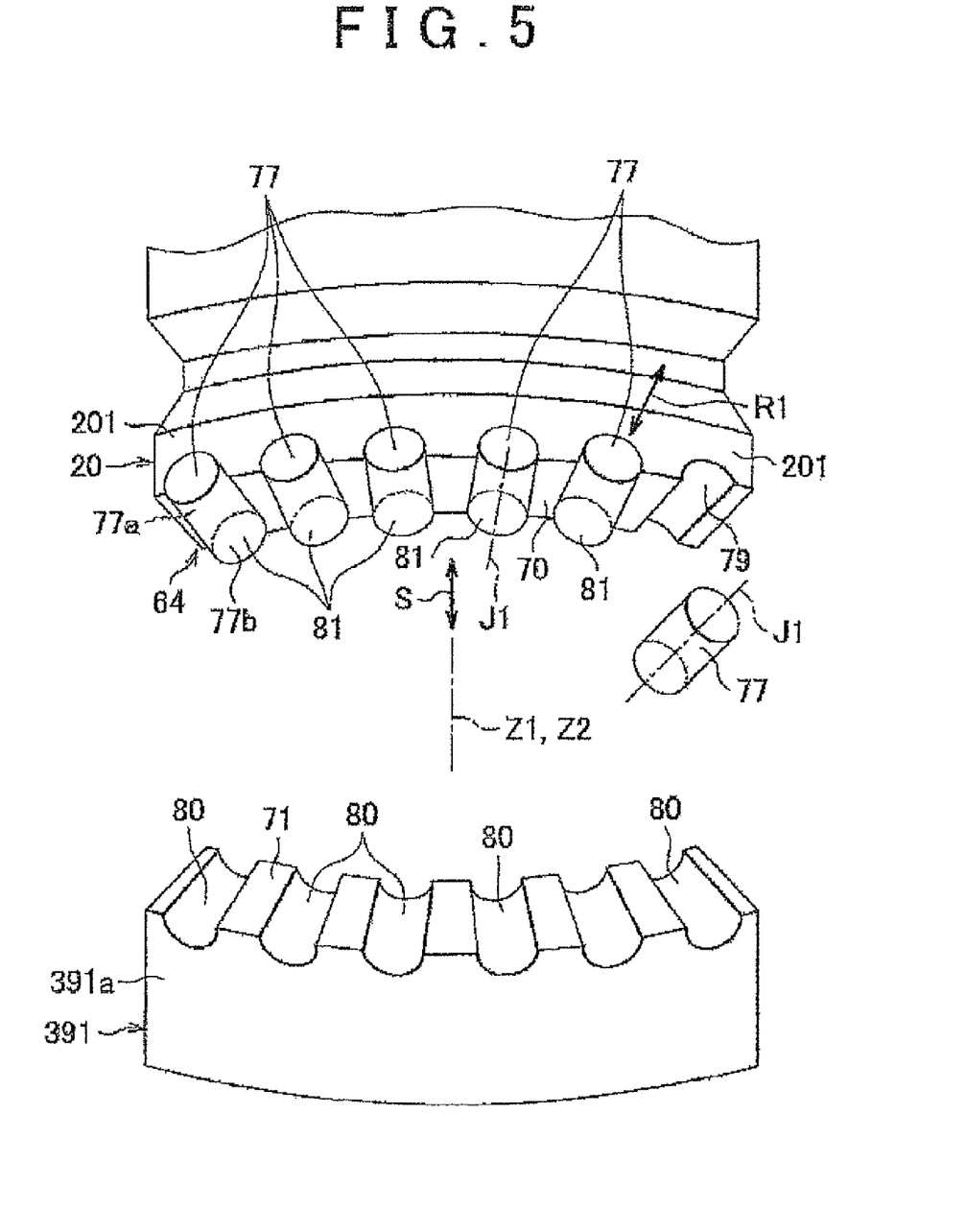
FIG. 5 is a perspective view of a relevant portion of first concave convex engaging portions.

FIG. 5 is a perspective view of a relevant portion of the first concave convex engaging portions 64. Referring to FIG. 4 and FIG. 5, a torque transmitting surface 70 that serves as one end surface of the input member body 201 and the first end surface 71 of the first end 391a face each other in an axial direction S of the steering shaft 3 (hereinafter, simply referred to as axial direction S). The first concave convex engaging portions 64 engage the torque transmitting surface 70 with the first end surface 71 so that torque is transmittable. The first concave convex engaging portions 64 include a plurality of retention grooves 79, the plurality of pins 77 and a plurality of tooth grooves 80. The plurality of retention grooves 79 are formed on the torque transmitting surface 70. The plurality of pins 77 are retained in the respective retention grooves 79. The plurality of tooth grooves 80 are formed on the first end surface 71 of the first end 391a of the inner ring 391 and engage with the pins 77. The input member 20 constitutes one of the first and second gears, and has the retention grooves 79 and the pins 77. The inner ring 391 constitutes the other one of the first and second gears, and has the tooth grooves 80.

Note that, in the present embodiment, the input member 20 has the retention grooves 79 and the pins 77, and the first end 391a of the inner ring 391 has the tooth grooves 80; however, the configuration is not limited to this embodiment. Instead, it is also applicable that the first end 391a of the inner ring 391 has the retention grooves 79 and the pins 77 and the input member body 201 has the tooth grooves 80. In this case, the input member 20 is the other one of the first and second gears, and the inner ring 391 is one of the first and second gears.

The retention grooves 79, the pins 77 and the tooth grooves 80 are arranged at equiangular intervals over the respective entire regions of the corresponding torque transmitting surface 70 and fast end surface 71 in the circumferential direction.

The pins 77 are used for forming teeth 81 of the input member 20, and are needle rollers each having, for example, a cylindrical shape. These pins 77 are arranged so as to radiate around the first axis Z1. Half of each pin 77 protrudes from a corresponding one of the retention grooves 79 to have a semi-spherical shape in cross section. The protruded half serves as the tooth 81 of the input member 20. Outer ends 77a of the pins 77 in the radial direction R1 of the input member 20 are collectively retained by the annular outer retainer 76. Inner ends 77b of the pins 77 in the radial direction R1 of the input member 20 are collectively retained by the annular inner retainer 75.

The pins 77 are mounted on the input member body 201 by these outer retainer 76 and inner retainer 75. The outer retainer 76 and the inner retainer 75 each are made of an elastic member, such as synthetic resin.

Figure 6:
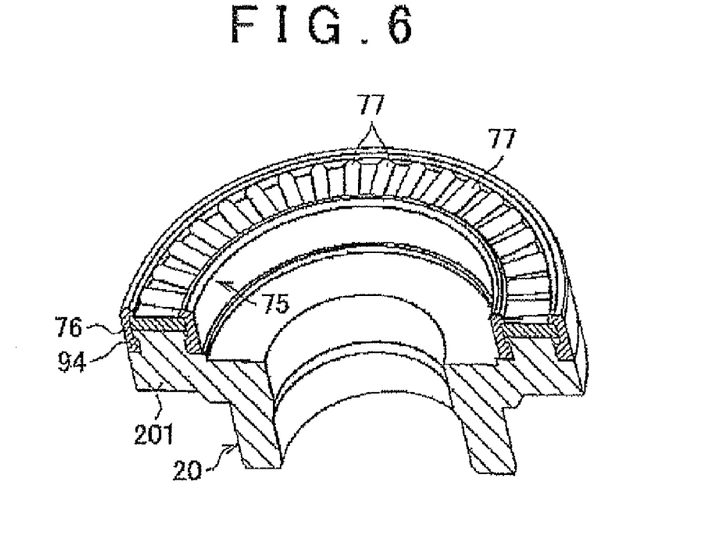
FIG. 6 is a perspective cross-sectional view that shows part of an input member.
Figure 7:
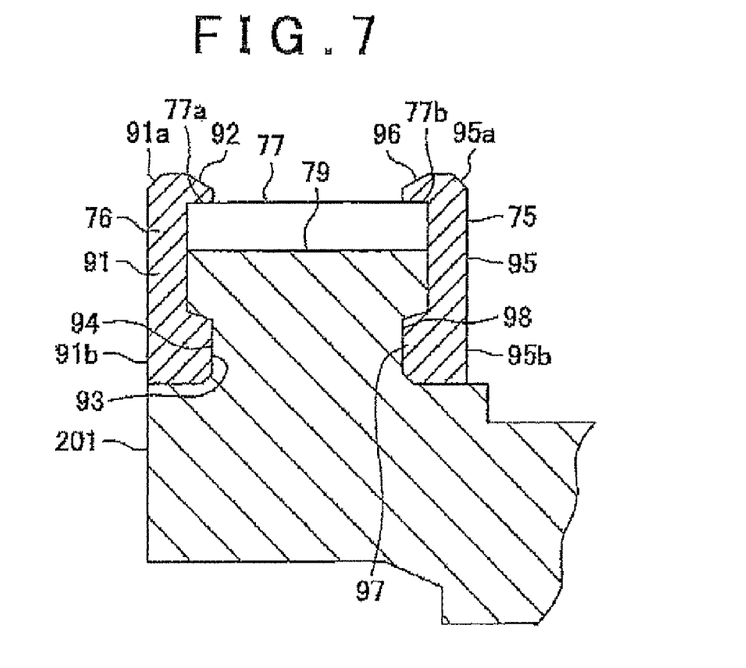
FIG. 7 is an enlarged cross-sectional view of a relevant portion of FIG. 6.

FIG. 6 is a perspective cross-sectional view that shows part of the input member 20. FIG. 7 is an enlarged cross-sectional view of a relevant portion of FIG. 6. Referring to FIG. 6 and FIG. 7, the outer retainer 76 has an annular body 91. One end 91a of the body 91 in the axial direction has an annular protrusion 92 that protrudes radially inward of the body 91.

The other end 91b of the body 91 in the axial direction has an annular engaging protrusion 93 that protrudes radially inward of the body 91.

The outer ends 77a of the pins 77 are held and retained by the annular protrusion 92 and the retention grooves 79 of the input member body 201. The engaging protrusion 93 is engaged with an engaging portion 94 that is an annular recess formed on an outer periphery of the input member body 201. By so doing, the outer retainer 76 is mounted on the input member body 201.

The inner retainer 75 has an annular body 95. One end 95a of the body 95 in the axial direction has an annular protrusion 96 that protrudes radially outward of the body 95. The other end 95b of the body 95 in the axial direction has an annular engaging protrusion 97 that protrudes radially outward of the body 95. The inner ends 77b of the pins 77 are held and retained by the annular protrusion 96 and the retention grooves 79 of the input member body 201. The engaging protrusion 97 is engaged with an engaging portion 98 that is an annular recess formed on an inner periphery of the input member body 201. By so doing, the inner retainer 75 is mounted on the input member body 201.

Referring to FIG. 5, the retention grooves 79 are formed in a long slender shape so as to radiate around the first axis Z1. The retention grooves 79 extend over the entire region of the torque transmitting surface 70 in the radial direction of the input member 20, and are arranged at equiangular intervals in the circumferential direction of the input member body 201. The number of the retention grooves 79 is equal to the number of the pins 77. The pins 77 are retained in the retention grooves 79. Note that FIG. 5 does not show the inner retainer 75 or the outer retainer 76.

The tooth grooves 80 are formed in a long slender shape so as to radiate around the second axis Z2. The tooth grooves 80 extend over the entire region of the first end 391a in the radial direction of the inner ring 391, and are arranged at equiangular intervals in the circumferential direction of the first end 391a. The number of the tooth grooves 80 is equal to the number of the pins 77 or is different from the number of the pins 77. Depending on a difference between the number of the pins 77 and the number of the tooth grooves 80, it is possible to change the speed between the input member body 201 and the inner ring 391.

Referring back to FIG. 4, the second axis Z2 of the inner ring 391 is inclined by a predetermined angle σ with respect to the first axis Z1 of the input member 20. Thus, part of the teeth 81 and part of the tooth grooves 80 are in mesh with each other.

Figure 8:
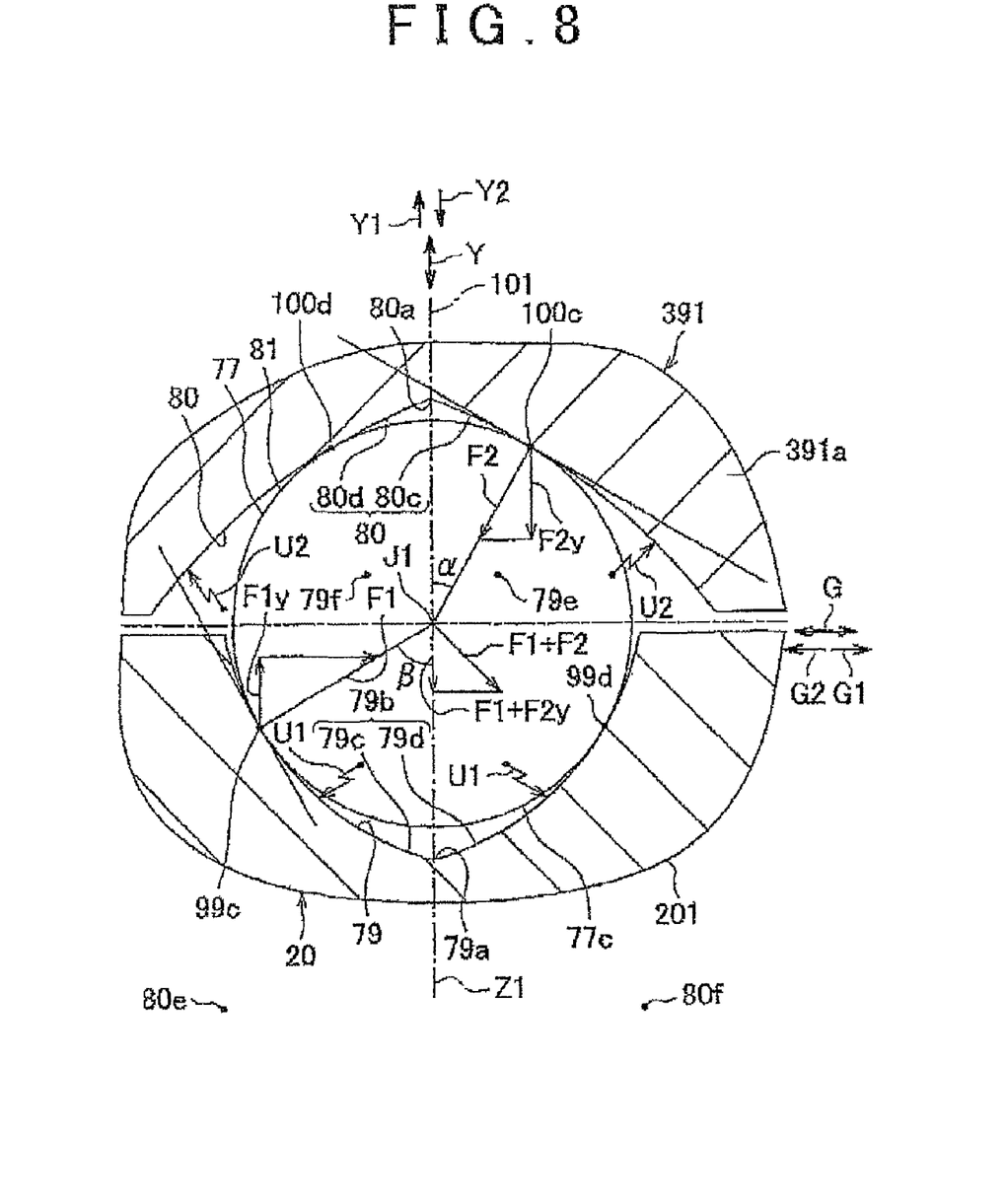
FIG. 8 is a cross-sectional view of a relevant portion, taken along the line VIII-VIII in FIG. 4.

FIG. 8 is a cross-sectional view of a relevant portion, taken along the line VIII-VIII in FIG. 4. FIG. 8 shows a cross section perpendicular to the longitudinal direction of the pin 77 (pin 771) that is in mesh with the tooth groove 80. When described with reference to FIG. 8, the cross section perpendicular to the pin 771 is used as a reference.

Referring to FIG. 8, one of the features of the present embodiment is that a resultant force F1+F2 of a force F1 applied to the pin 77 from the retention groove 79 and a force F2 applied to the pin 77 from the tooth groove 80 urges the pin 77 toward a bottom 79a of the retention groove 79 between the bottom 79a of the retention groove 79 and a bottom 80a of the tooth groove 80.

Specifically, the cross section of an inner surface 79b of the retention groove 79 of the input member body 201 has a so-called Gothic arch shape, so the bottom 79a has a sharp shape. The shape of the cross section of the inner surface 79b is the same over the entire region of the retention groove 79 in the longitudinal direction. The inner surface 79b has a pair of first portions 79c and 79d that are located on opposite sides of the bottom 79a of the retention groove 79 and that are arranged in the circumferential direction G of the input member 20. The first portion 79c is a circular arc surface having a relatively smaller predetermined curvature radius U1. The first portion 79d and the first portion 79c have symmetrical shapes. The first portion 79d is a circular arc surface having the same curvature radius U1 as that of the first portion 79c. The center of curvature 79e of the first portion 79c and the center of curvature 79f of the first portion 79d are offset from each other in the circumferential direction G.

In addition, the cross section of an inner surface 80b of the tooth groove 80 formed on the first end 391a of the inner ring 391 has a so-called Gothic arch shape, so the bottom 80a has a sharp shape. The shape of the cross section of the inner surface 80b is the same over the entire region of the tooth groove 80 in the longitudinal direction. The inner surface 80b has a pair of second portions 80c and 80d that are located on opposite sides of the bottom 80a of the tooth groove 80 and that are arranged in the circumferential direction of the inner ring 391. The second portion 80c is a circular arc surface having a relatively large predetermined curvature radius U2. The second portion 80d and the second portion 80c have symmetrical shapes. The second portion 80d is a circular arc surface having the same curvature radius U2 as that of the second portion 80c. The center of curvature 80e of the second portion 80c and the center of curvature 80f of the second portion 80d are offset from each other in the circumferential direction of the inner ring 391.

The outer peripheral surface 77c of the pin 77 and the pair of first portions 79c and 79d of the retention groove 79 are in contact with each other at corresponding first contact points 99c and 99d (contact lines). Similarly, the outer peripheral surface 77c of the pin 77 and the pair of second portions 80c and 80d of the tooth groove 80 are in contact with each other at corresponding second contact points 100c and 100d (contact lines). That is, the pin 77 is in contact with the retention groove 79 and the tooth groove 80 at four contact points.

The first portion 79c of the retention groove 79 and the second portion 80c of the tooth groove 80 face each other via the central axis J1 of the pin 77. The first portion 79c of the retention groove 79 makes a first contact angle β with the pin 77 at the first contact point 99c. The first contact angle β is an angle made between a reference plane 101 and the line of action of the first force F1. The reference plane 101 includes the central axis J1 of the pin 77 and the first axis Z1. The first force F1 serves as a force applied from the first portion 79c of the retention groove 79 to the first contact paint 99c of the pin 77. In addition, the second portion 80c of the tooth groove 80 makes a second contact angle α with the pin 77 at the second contact point 100c. The second contact angle α is an angle made between the reference plane 101 and the line of action of the second force F2. The second force F2 serves as a force applied from the second portion 80c of the tooth groove 80 to the second contact point 100c of the pin 77. As described above, the curvature radius U1 of the first portion 79c of the retention groove 79 is relatively small, and the curvature radius U2 of the second portion 80c of the tooth groove 80 is relatively large, so the second contact angle α is relatively small and the first contact angle β is relatively large (α<β).

With the above configuration, when the input member 20 rotates in one direction G1 in the circumferential direction G, a component F1y of the first force F1 in a direction Y parallel to the reference plane 101 and in a direction Y1 from the retention groove 79 toward the tooth groove 80 is relatively small. In addition, a component F2y of the second force F2 in the direction Y parallel to the reference plane 101 and in a direction Y2 from the tooth groove 80 toward the retention groove 79 is relatively large. Thus, the sum F1y+F2y of the component F1y of the first force F1 and the component F2y of the second force F2, parallel to the reference plane 101, is directed in the direction Y2 from the tooth groove 80 toward the retention groove 79 in the direction Y parallel to the reference plane 101, and acts to urge the pin 77 toward the bottom 79 of the retention groove 79.

In addition, the first portion 79d of the retention groove 79 and the first portion 79c have symmetrical shapes, and the second portion 80d of the tooth groove 80 and the second portion 80c have symmetrical shapes. By so doing, when the input member 20 rotates in the other direction G2 in the circumferential direction G as well, as in the case where the input member 20 rotates in the one direction G1, force that urges the retention groove 79 toward the bottom 79a of the retention groove 79 is applied to the pin 77.

Figure 9:
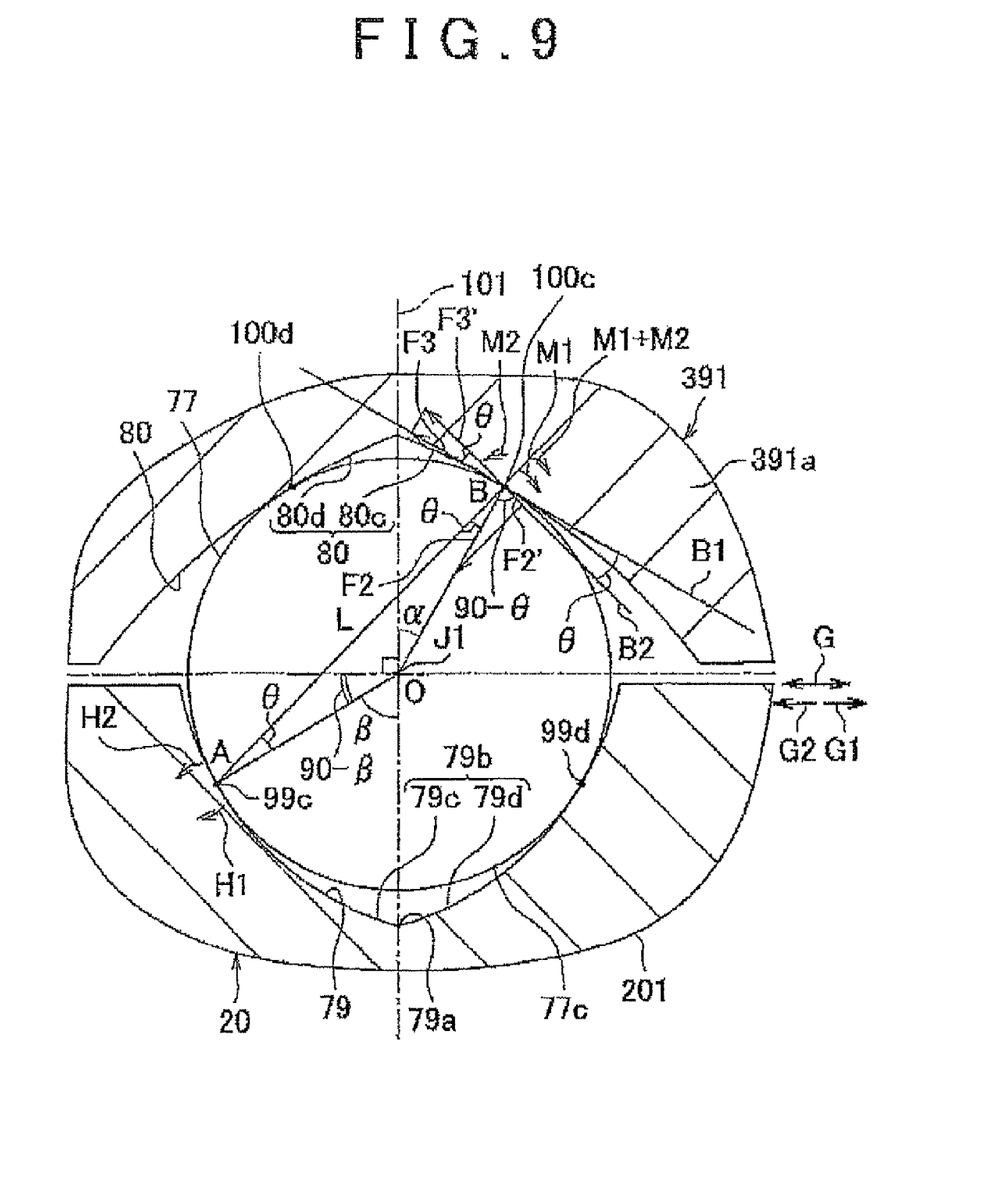
FIG. 9 is a cross-sectional view taken along the same line as FIG. 8, illustrating the moment applied to a pin.

FIG. 9 is a cross-sectional view taken along the same line as FIG. 8, illustrating the moment applied to the pin 77. Referring to FIG. 9, another feature of the present embodiment is that, in order to further reliably prevent the pin 77 from slipping off from the retention groove 79, between a first moment M1 and a second moment M2 around the first contact point 99c, the first moment M1 is larger than the second moment M2.

The first moment M1 is a moment that the second force F2 applied to the pin 77 from the second portion 80c of the inner surface 80b of the tooth groove 80 rotates the pin 77 in one direction H1 around the first contact point 99c. The second moment M2 is a moment that a frictional force F3 of the pin 77 against the first portion 80c of the inner surface 80b of the tooth groove 80 rotates the pin 77 in the other direction H2 around the first contact point 99c.

By increasing the second moment M2 as compared with the first moment M1, the sum M1+M2 of these moments M1 and M2 is applied, in the one direction H1 around the first contact point 99c. Thus, the pin 77 is urged toward the bottom 79a of the retention groove 79, and it is possible to further reliably prevent the pin 77 from slipping off from the retention groove 79.

In order to increase the first moment M1 as compared with the second moment M2, the coefficient of friction between the pin 77 and the second portion 80c of the tooth groove 80 is defined as μ, the following inequality (1) holds.

$$(\beta-\alpha) > 2 \times \tan^{-1}(\mu) \tag{1}$$

The reason why the first moment M1 is larger than the second moment M2 when the inequality (1) holds will be described as follows.

First, in FIG. 9, where the line segment that connects the first contact point 99c to the second contact point 100c is a line segment AB, the line segment that connects the first contact point 99c to the central axis J1 of the pin 77 is a line segment AO and the line segment that connects the second contact point 100c to the central axis J1 of the pin 77 is a tine segment BO, a triangle OAB is an isosceles triangle such that the length of the line segment AO and the length of the line segment BO each are equal to the radius of the pin 77. Thus, an angle OAB and an angle OBA each are a predetermined angle θ. In addition, where the tangent of the outer peripheral surface 77c of the pin 77 at point B (second contact point 100c) is a tangent B1 and the straight line that passes through the point B and that intersects at a right angle with the line segment AB is a straight line B2, an inclination angle made between the tangent B1 and the straight line B2 is the predetermined angle θ. In addition, an angle made between the line segment BO and a portion of the straight line B2 extending from the point B toward the retention groove 79 is (90−θ)°.

Here, when the input member 20 rotates in the one direction G1 in the circumferential direction, the above described second force F2 is applied from the tooth groove 80 to the second contact point 100c, and the frictional force F3 caused by frictional contact between the pin 77 and the tooth groove 80 is also applied to the second contact point 100c.

The frictional force F3 is obtained by the equation F3=μ×F2. From FIG. 9, a component F3' of the frictional force F3 in the straight line B2 direction is obtained by the equation F3'=F3×cosθ=F2×μ×cosθ. Thus, where the length of the line segment AB is defined as L, the second moment M2 that the frictional force F3 rotates the pin 77 in the other direction H2 around the first contact point 99c is expressed by the following mathematical expression (2).

$$F3' \times L = F2 \times \mu \times \cos\theta \times L \quad (2)$$

In addition, from FIG. 9, a component of the second force F2 in the straight line B2 direction is expressed by F2'=F2×cos(90−θ)=F2×sinθ. Thus, the first moment M1 that the second force F2 rotates the pin 77 in one direction H1 around the first contact point 99c is expressed by the following mathematical expression (3).

$$F2' \times L = F2 \times \sin\theta \times L \quad (3)$$

Accordingly, when the first moment M1 is larger than the second moment M2, that is, when the mathematical expression (2)<the mathematical expression (3), a moment M1+M2 that rotates the pin 77 in one direction H2 around the first contact point 99c is applied to the pin 77, and the pin 77 is urged toward the bottom 79a of the retention groove 79 by the moment M1+M2.

The relationship the mathematical expression (2)<the mathematical expression (3) is equivalent to F2×μ×cosθ×L<F2×sinθ×L. When the above inequality is divided by F2 and L, μcosθ<sinθ is obtained, and it may be transformed into μ<sinθ/cosθ. Therefore, the following inequality is obtained.

$$\mu < \tan\theta \quad (4)$$

Here, when the isosceles triangle OBA, is used, because the sum of the interior angles of the triangle OBA is 180°, so it holds that 180=θ+θ+{α+90+(90−β)}=2×θ+180+α−β. Thus, 2×θ=β−α, so θ=(β−α)/2.

When the above θ is substituted into the inequality (4), μ<tan{(β−α)/2} is obtained. Thus, $\tan^{-1}(\mu) < (\beta-\alpha)/2$ is obtained. When the above inequality is transformed, (β−α)>2×tan$^{-1}$(μ), that is, the inequality (1), is obtained.

Thus, to urge the pin 77 toward the bottom 79a of the retention groove 79 by the moment around the first contact point 99c, it is only necessary that a difference in angle (β−α) between the first contact angle β and the second contact angle α is larger than 2×tan$^{-1}$(μ).

Figure 10:
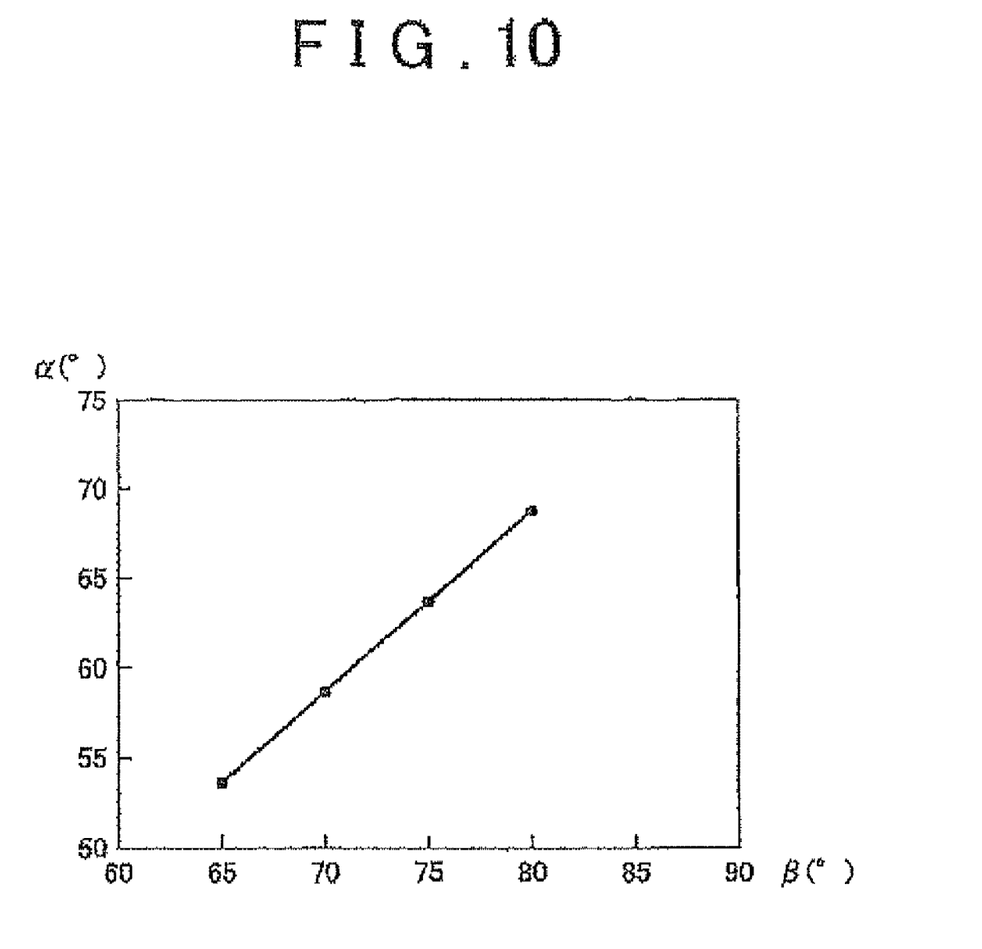
FIG. 10 is a graph that shows the relationship between a first contact angle and a second contact angle.

For example, when the coefficient of friction μ is 0.1, it is only necessary that the difference in angle (β−α) is larger than 2×tan$^{-1}$(0.1)≈11.4°. Therefore, the first contact angle β and the second contact angle α may be, for example, set so as to satisfy the relationship shown in the graph of FIG. 10. The first contact angle β is larger the more desirable. However, because of restrictions on machining of the retention groove 79, the first contact angle β is, for example, set at about 81°±2°. In addition, the second contact angle α is, for example, set at about 66.5°±2° in terms of prevention of slipping of the pin 77. The above ±2° is a dimensional tolerance.

In addition, the first portion 79d of the retention groove 79 and the first portion 79c have symmetrical shapes, and the second portion 80d of the tooth groove 80 and the second portion 80c have symmetrical shapes. By so doing, when the input member 20 rotates in the other direction G2 in the circumferential direction G as well, as in the case where the input member 20 rotates in the one direction G1, moment that urges the pin 77 toward the bottom 79a of the retention groove 79 is applied to the pin 77.

Referring to FIG. 4, the torque transmitting surface 73 that serves as one end surface of the output member body 221 and the second end surface 72 of the inner ring 391 face each other in the axial direction S, and the second concave convex engaging portions 67 engage the torque transmitting surface 73 with the second end surface 72 so that torque is transmittable. The second concave convex engaging portions 67 include a plurality of retention grooves 109, a plurality of pins 87 and a plurality of tooth grooves 110. The plurality of retention grooves 109 are formed on the torque transmitting surface 73. The plurality of pins 87 are retained in the respective retention grooves 109. The plurality of tooth grooves 110 are formed on the second end surface 72 of the second end 391b of the inner ring 391 and engage with the pins 87. The output member 22 constitutes one of the first and second gears, and has the retention grooves 109 and the pins 87. The inner ring 391 constitutes the other one of the first and second gears, and has the tooth grooves 110.

Note that, in the present embodiment, the output member 22 has the retention grooves 109 and the pins 87, and the second end 391b of the inner ring 391 has the tooth grooves 110; however, the configuration is not limited to this embodiment. Instead, it is also applicable that the second end 391b of the inner ring 391 has the retention grooves 109 and the pins 87 and the output member body 221 has the tooth grooves 110. In this ease, the output member 22 is the other one of the first and second gears, and the inner ring 391 is one of the first and second gears.

The retention grooves 109 and pins 87 of the second concave convex engaging portions 67 have similar configuration to the retention grooves 79 and pins 77 of the first concave convex engaging portions 64. The tooth grooves 110 of the second concave convex engaging portions 67 have similar configuration to the tooth grooves 80 of the first concave convex engaging portions 64. Therefore, the detailed description of the second concave convex engaging portions 67 is omitted. In addition, the inner retainer 85 and the outer retainer 86 for retaining the pins 87 of the second concave convex engaging portions 67 are provided. These retainers 85 and 86 have similar configurations to the corresponding inner retainer 75 and outer retainer 76, so the detailed description thereof is omitted.

Referring to FIG. 3, the rotor 231 of the transmission ratio variable mechanism motor 23 includes a cylindrical rotor core 112 and a permanent magnet 113. The rotor core 112 extends in the axial direction S. The permanent magnet 113 is fixed to an outer peripheral surface of the rotor core 112. In the present embodiment, the rotor core 112 that supports the outer ring 392 of the raceway ring unit 39 rotatably supports the cylindrical member 202 of the input member 20 via a first bearing 31, and rotatably supports the cylindrical member 222 of the output member 22 via a third bearing 33. In addition, the rotor core 112 is supported at both ends by second and fourth bearings 32 and 34 that are located on opposite sides of the first and third bearings 31 and 33 in the axial direction S. The second bearing 32 is held in an annular protrusion 114 that is formed on an inner peripheral portion of one end of the first housing 51. The fourth bearing 34 is held on an annular extending portion 115 formed on an inner peripheral portion of the other end of the second housing 52.

The annular extending portion 115 has a cylindrical shape that extends from a partition wall portion 116 provided at the other end of the second housing 52 toward the one direction S1 in the axial direction S, and is inserted in the rotor core 112.

The stator 232 of the transmission ratio variable mechanism motor 23 is fixed to the inner peripheral surface of the first housing 51 by shrinkage fitting, or the like, and surrounds the permanent magnet 113 of the rotor 231.

The motor resolver 43 includes a resolver rotor 117 and a resolver stator 118. The resolver rotor 117 is fixed to the outer peripheral surface of the other end of the rotor core 112. The resolver stator 118 is fixed to the inner peripheral surface of the second housing 52.

The torque sensor 44 is arranged radially inward of the rotor core 112 of the transmission ratio variable mechanism motor 23.

Referring to FIG. 2, a fifth bearing 35 is arranged on the other side S2 of the torque sensor 44 in the axial direction S. The fifth bearing 35 is held at the partition wall portion 116 of the second housing 52, and rotatably supports one end of the third shaft 13. The second shaft 12 and the third shaft 13 are rotatably supported relative to each other via a sixth bearing 36. A seventh bearing 37 is interposed between an intermediate portion of the third shaft 13 and the end wall portion 61 of the third housing 53. The end wall portion 61 rotatably supports the third shaft 13 via the seventh bearing 37.

As described above, according to the present embodiment, in the first gear set 78, the resultant force F1+F2 of forces applied to each pin 77 from the retention groove 79 and the tooth groove 80 is configured to urge the pin 77 toward the bottom 79a of the retention groove 79. By so doing, it is possible to urge the pin 77 so as not to slip off from the retention groove 79. Thus, it is possible to prevent lifting or slipping of the pins 77 that constitute the teeth 81. As a result, it is possible to suppress a torque loss or occurrence of noise in the first gear set 78.

In the second gear set 88 as well, because of a function similar to the function of the first gear set 78, it is possible to further reliably prevent lifting or slipping of the pins 87 that constitute the teeth 111 from the output member body 221. As a result, it is possible to suppress a torque loss or occurrence of noise in the second gear set 88.

In addition, in the first gear set 78, the first contact angle β at which the pin 77 contacts with the retention groove 79 is larger than the second contact angle α at which the pin contacts with the tooth groove 80. By so doing, the component F1y of the force f1 applied from the retention groove 79 to the pin 77 in the direction Y1 from the retention groove 79 toward the tooth groove 80 may be relatively reduced, and the component F2y of the force F2 applied from the tooth groove 80 to the pin 77 in the direction Y2 from the tooth groove 80 toward the retention groove 79 may be relatively increased. By so doing, the sum F1y +F2y of the two components F1y and F2y is directed in the direction Y2 from the tooth groove 80 toward the retention groove 79, so it is possible to reliably urge the pin 77 toward the retention groove 79 of the input member body 201.

In the second gear set 88 as well, because of a function similar to the function of the first gear set 78, it is possible to reliably urge the pin 87 toward the retention groove 109 of the output member body 221.

Furthermore, in the first gear set 78, the first moment M1 is larger than the second moment M2 associated with the pin 77. The first moment M1 is a moment that urges the pin 77 toward the bottom 79a of the retention groove 79. The second moment M2 is a moment that acts to cause the pin 77 to slip off from the retention groove 79. The first moment M1 is larger than the second moment M2, so the sum M1+M2 of the first and second moments M1 and M2 becomes a moment that urges the pin 77 toward the bottom 79a of the retention groove 79. Thus, it is possible to further reliably prevent the pin 77 from slipping off from the retention groove 79 of the input member body 201.

In the second gear set 88 as well, because of a function similar to the function of the first gear set 78, it is possible to further reliably prevent the pin 87 from slipping off from the retention groove 109 of the output member body 221.

In addition, in the first gear set 78, force applied to the inner retainer 75 and the outer retainer 76 from the pins 77 may be small, so the strength necessary for these inner retainer 75 and outer retainer 76 may be small. Thus, it is possible to reduce the size of the first gear set 78 by reducing the size of the inner retainer 75 and the size of the enter retainer 76.

In the second gear set 88 as well, because of similar advantageous effects to those of the first gear set 78, it is possible to reduce the size of the second gear set 88 by reducing the size of the inner retainer 85 and the size of the outer retainer 86.

The aspect of the invention is not limited to the embodiment described above; it may be modified in various forms within the scope of the appended claims.

Figure 11:
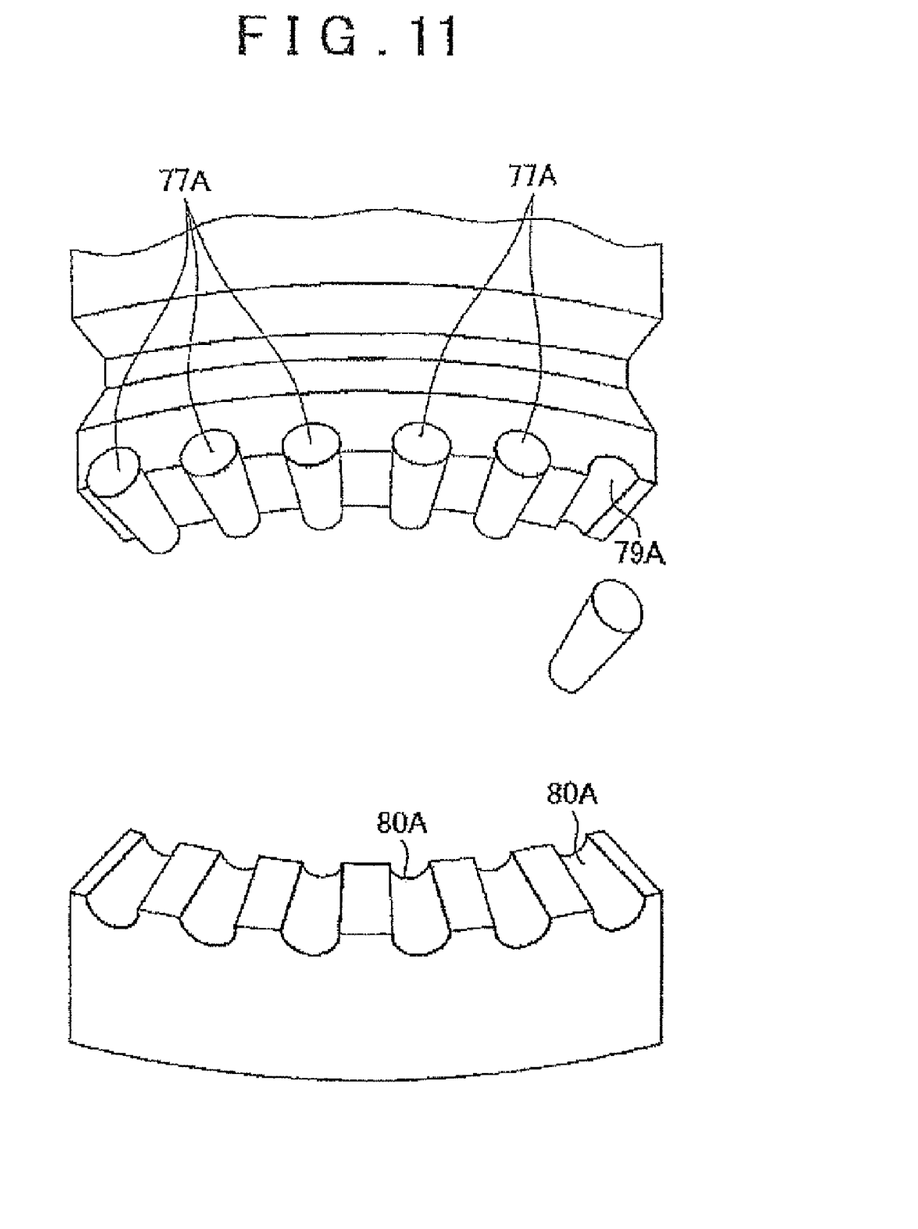
FIG. 11 is a perspective view of a relevant portion according to a second embodiment of the invention.

For example, as in the case of a second embodiment shown in FIG. 11, truncated cone-shaped pins 77A and retention grooves 79A and tooth grooves 80A that coincide with the shapes of the pins 77A may be used. Each pin 77A has a diameter that reduces as it goes radially inward of the input member body 201.

In addition, it is also applicable that, in only one of the first and second gear sets 78 and 88, the first contact angle β is larger than the second contact angle α.

Furthermore, the above embodiments are applied to a column electric power steering system in which the steering assist motor 25 is arranged in the steering column; however, the aspect of the invention is not limited to this configuration. For example, the aspect of the invention may be applied to a rack assist electric power steering system in which the steering assist motor 25 is provided for a steering rack housing. In addition, the aspect of the invention may be applied to a pinion assist power steering system in which the steering assist motor 25 is arranged in the pinion shaft 15.

Furthermore, in the above embodiments, the transmission ratio variable mechanism 5 is arranged in the steering shaft 3. Instead, the transmission ratio variable mechanism 5 may be arranged in the intermediate shaft 8 or the pinion shaft 15.

In addition, the transmission ratio variable mechanism according to the aspect of the invention may be applied to another system other than a vehicle steering system. For example, the transmission ratio variable mechanism according to the aspect of the invention may be, for example, used for a toe angle variable mechanism that is able to change the toe angle of a wheel of a vehicle, a camber angle variable mechanism that is able to change the camber angle of a wheel of a vehicle, or a damping force variable mechanism that is able to change the damping force of a shock absorber of a vehicle.

Furthermore, the aspect of the invention may be applied to another gear set that includes first and second gears serving as a pair of gears or may be applied to a gear set provided for another general system other than a vehicle steering system.

What is claimed is:
1. A gear set comprising:
a first gear that is rotatable around a first axis; and
a second gear that is rotatable around a second axis inclined with respect to the first axis, and that is in mesh with the first gear so that torque is transmittable, wherein one of the first and second gears includes a plurality of retention grooves that are arranged so as to radiate around the axis of the one of the first and second gears and a plurality of pins that are retained in the respective retention grooves and that respectively constitute teeth of the one of the first and second gears, the other one of the first and second gears includes a plurality of tooth grooves that are arranged so as to radiate around the axis of the other one of the first and second gears and that are engageable with the pins, a resultant force of forces applied to each pin from the retention groove and the tooth groove urges the pin toward the retention groove, and a first contact angle at which each pin contacts with an inner surface of the retention groove is larger than a second contact angle at which the pin contacts with an inner surface of the tooth groove.

2. The gear set according to claim 1, wherein a first moment that force applied to each pin from the tooth groove rotates the pin around a contact point between the retention groove and the pin is larger than a second moment that frictional force of the pin against the inner surface of the tooth groove rotates the pin around the contact point.

3. A gear set comprising:
a first gear that is rotatable around a first axis; and
a second gear that is rotatable around a second axis inclined with respect to the first axis, and that is in mesh with the first gear so that torque is transmittable, wherein
one of the first and second gears includes a plurality of retention grooves that are arranged so as to radiate around the axis of the one of the first and second gears and a plurality of pins that are retained in the respective retention grooves and that respectively constitute teeth of the one of the first and second gears,
the other one of the first and second gears includes a plurality of tooth grooves that are arranged so as to radiate around the axis of the other one of the first and second gears and that are engageable with the pins,
a resultant force of forces applied to each pin from the retention groove and the tooth groove urges the pin toward the retention groove, and
a first moment that force applied to each pin from the tooth groove rotates the pin around a contact point between the retention groove and the pin is larger than a second moment that frictional force of the pin against the inner surface of the tooth groove rotates the pin around the contact point.

4. A nutation gear set comprising:
a pair of first gears that are arranged to face each other so as to be rotatable around a first axis; and
a pair of second gears that are formed on both surfaces of an intermediate member interposed between the pair of first gears, that are rotatable around a second axis inclined with respect to the first axis, and that are respectively in mesh with the first gears so that torque is transmittable, wherein
one of the pair of first gears and the pair of second gears include a plurality of retention grooves that are arranged so as to radiate around the axis of the one of the pair of first gears and the pair of second gears and a plurality of pins that are retained in the respective retention grooves and that constitute teeth of the one of the pair of first gears and the pair of second gears,
the other one of the pair of first gears and the pair of second gears include a plurality of tooth grooves that are arranged so as to radiate around the axis of the other one of the pair of first gears and the pair of second gears and that are engageable with the pins,
a resultant force of forces applied to each pin from the retention groove and the tooth groove urges the pin toward the retention groove, and
a first contact angle at which each pin contacts with an inner surface of the retention groove is larger than a second contact angle at which the pin contacts with an inner surface of the tooth groove.

5. The nutation gear set according to claim 4, wherein a first moment that force applied to each pin from the tooth groove rotates the pin around a contact point between the retention groove and the pin is larger than a second moment that frictional force of the pin against the inner surface of the tooth groove rotates the pin around the contact point.

6. A nutation gear set comprising:
a pair of first gears that are arranged to face each other so as to be rotatable around a first axis; and
a pair of second gears that are formed on both surfaces of an intermediate member interposed between the pair of first gears, that are rotatable around a second axis inclined with respect to the first axis, and that are respectively in mesh with the first gears so that torque is transmittable, wherein
one of the pair of first gears and the pair of second gears include a plurality of retention grooves that are arranged so as to radiate around the axis of the one of the pair of first gears and the pair of second gears and a plurality of pins that are retained in the respective retention grooves and that constitute teeth of the one of the pair of first gears and the pair of second gears,
the other one of the pair of first gears and the pair of second gears include a plurality of tooth grooves that are arranged so as to radiate around the axis of the other one of the pair of first gears and the pair of second gears and that are engageable with the pins,
a resultant force of forces applied to each pin from the retention groove and the tooth groove urges the pin toward the retention groove, and
a first moment that force applied to each pin from the tooth groove rotates the pin around a contact point between the retention groove and the pin is larger than a second moment that frictional force of the pin against the inner surface of the tooth groove rotates the pin around the contact point.

7. A nutation gear set comprising:
a pair of first gears that are arranged to face each other so as to be rotatable around a first axis; and
a pair of second gears that are formed on both surfaces of an intermediate member interposed between the pair of first gears, that are rotatable around a second axis inclined with respect to the first axis, and that are respectively in mesh with the first gears so that torque is transmittable, wherein
the pair of first gears include a plurality of retention grooves that are arranged so as to radiate around the first axis and a plurality of pins that are retained in the respective retention grooves by a pair of retainers and that constitute teeth of the pair of first gears,
the pair of second gears include a plurality of tooth grooves that are arranged so as to radiate around the second axis and that are engageable with the pins.,
a resultant force of forces applied to each pin from the retention groove and the tooth groove urges the pin toward the retention groove, and
a first contact angle at which each pin contacts with an inner surface of the retention groove is larger than a second contact angle at which the pin contacts with an inner surface of the tooth groove.

8. The nutation gear set according to claim 7, wherein a first moment that force applied to each pin from the tooth groove rotates the pin around a contact point between the retention groove and the pin is larger than a second moment that frictional force of the pin against the inner surface of the tooth groove rotates the pin around the contact point.

9. A nutation gear set comprising:
- a pair of first gears that are arranged to face each other so as to be rotatable around a first axis; and
- a pair of second gears that are formed on both surfaces of an intermediate member interposed between the pair of first gears, that are rotatable around a second axis inclined with respect to the first axis, and that are respectively in mesh with the first gears so that torque is transmittable, wherein
- the pair of first gears include a plurality of retention grooves that are arranged so as to radiate around the first axis and a plurality of pins that are retained in the respective retention grooves by a pair of retainers and that constitute teeth of the pair of first gears,
- the pair of second gears include a plurality of tooth grooves that are arranged so as to radiate around the second axis and that are engageable with the pins,
- a resultant force of forces applied to each pin from the retention groove and the tooth groove urges the pin toward the retention groove, and
- a first moment that force applied to each pin from the tooth groove rotates the pin around a contact point between the retention groove and the pin is larger than a second moment that frictional force of the pin against the inner surface of the tooth groove rotates the pin around the contact point.

* * * * *